(12) United States Patent
Indrasena

(10) Patent No.: US 9,637,706 B2
(45) Date of Patent: May 2, 2017

(54) REFINEMENT OF OILS USING GREEN TEA EXTRACT ANTIOXIDANTS

(71) Applicant: DSM Nutritional Products AG, Columbia, MD (US)

(72) Inventor: Weerasinghe M. Indrasena, Dartsmouth (CA)

(73) Assignee: DSM IP Assets B.V., TE Heerlen (NL)

( * ) Notice: Subject to any disclaimer, the term of this patent is extended or adjusted under 35 U.S.C. 154(b) by 0 days.

(21) Appl. No.: 14/417,297

(22) PCT Filed: Jul. 31, 2013

(86) PCT No.: PCT/US2013/052919
§ 371 (c)(1),
(2) Date: Jan. 26, 2015

(87) PCT Pub. No.: WO2014/022505
PCT Pub. Date: Feb. 6, 2014

(65) Prior Publication Data
US 2015/0175934 A1    Jun. 25, 2015

Related U.S. Application Data

(60) Provisional application No. 61/677,572, filed on Jul. 31, 2012.

(51) Int. Cl.
| | |
|---|---|
| C11B 3/00 | (2006.01) |
| C11B 5/00 | (2006.01) |
| A23D 9/007 | (2006.01) |
| C11B 3/10 | (2006.01) |

(52) U.S. Cl.
CPC ............ *C11B 5/0092* (2013.01); *A23D 9/007* (2013.01); *C11B 3/00* (2013.01); *C11B 3/10* (2013.01); *C11B 5/0085* (2013.01)

(58) Field of Classification Search
CPC ....... C11B 5/0085; C11B 5/0092; C11B 3/00; C11B 3/10; A23D 9/007
USPC ........................................................ 554/194
See application file for complete search history.

(56) References Cited

U.S. PATENT DOCUMENTS

| | | | |
|---|---|---|---|
| 6,623,774 B2 * | 9/2003 | Kendrick | ............... A21D 2/165 |
| | | | 426/330.6 |
| 6,969,530 B1 | 11/2005 | Curtis et al. | |
| 6,974,592 B2 | 12/2005 | Yan | |
| 7,727,629 B2 | 6/2010 | Yan | |
| 8,034,450 B2 | 10/2011 | Curtis et al. | |
| 2005/0019416 A1 | 1/2005 | Yan | |
| 2005/0095301 A1 | 5/2005 | Deshpande | |
| 2007/0082111 A1 | 4/2007 | Macfarlane | |
| 2007/0141222 A1 | 6/2007 | Binder | |

(Continued)

FOREIGN PATENT DOCUMENTS

| | | |
|---|---|---|
| CN | 1262875 A | 8/2003 |
| CN | 1491576 A | 4/2004 |

(Continued)

*Primary Examiner* — Deborah D Carr
(74) *Attorney, Agent, or Firm* — Shannon McGarrah; Xi Chen

(57) ABSTRACT

Disclosed are methods of improving the sensory and oxidative stability of oils (e.g., plant and animal oils) by combining an oil and an antioxidant composition comprising green tea extract and deodorizing the oil. Oils prepared by these methods are also disclosed.

36 Claims, 7 Drawing Sheets

(56) References Cited

U.S. PATENT DOCUMENTS

| | | |
|---|---|---|
| 2007/0269566 A1 | 11/2007 | Curtis et al. |
| 2008/0213357 A1* | 9/2008 | Hebard ............... A61K 8/361 |
| | | 424/456 |
| 2010/0055281 A1 | 3/2010 | Barrow et al. |
| 2010/0130610 A1 | 5/2010 | Keller et al. |
| 2010/0173002 A1 | 7/2010 | Yulai et al. |
| 2011/0117180 A1 | 5/2011 | Yan et al. |
| 2011/0124897 A1* | 5/2011 | Van Der Waal ....... A23D 9/007 |
| | | 554/175 |

FOREIGN PATENT DOCUMENTS

| | | |
|---|---|---|
| CN | 1816613 A | 4/2006 |
| CN | 101378771 A | 8/2007 |
| CN | 102006780 A | 9/2009 |
| CN | 102018832 A | 4/2011 |
| EP | 1897530 A1 | 3/2008 |
| EP | 1950210 | 7/2008 |
| JM | JP2009519980 T | 9/2007 |
| JP | 08228678 | 9/1996 |
| JP | 2001073276 A2 | 9/1999 |
| KR | 20100027602 A | 3/2010 |
| KR | 20100098807 A | 9/2010 |
| WO | WO2004041251 | 5/2004 |
| WO | WO2004062389 | 7/2004 |
| WO | WO2005040318 | 5/2005 |
| WO | WO2007008384 | 1/2007 |
| WO | WO2007088046 A2 | 8/2007 |
| WO | WO2008024906 | 2/2008 |
| WO | WO2008043856 | 4/2008 |
| WO | WO2009115248 | 9/2009 |
| WO | WO2010033034 | 3/2010 |

\* cited by examiner

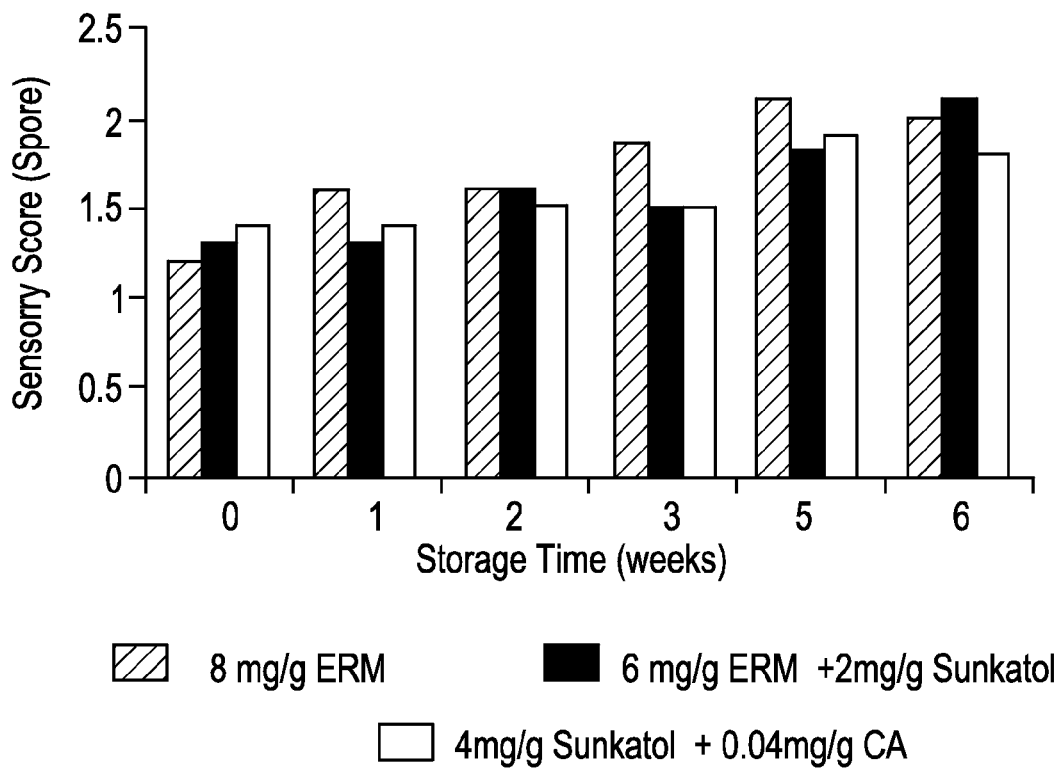

Sensory of FG30TG oil bleached/deodorized with green tea and rosemary extract during storage at ambient temperatures — ♦ — 2mg/g RM + 2m g/g Sunphenon OS-1 + 0.04mg/g CA
— ■ — 2mg/g RM + 2mg/g Sunkatol + 0.04mg/g CA
— ▲ — 8mg/g ERM Oxidative Stability Index of FG30TG with different antioxidants Sensory of FG30TG oil deodorized with green tea extract during storage at ambient temperature – ♦ – 2mg/g RM + 2mg/g Sunkatol before DO, 0.04m g/g CA after DO
— ■ — 0.5mg/g MNT + 2mg/g RM+2mg/g SUNPHENON-OS2 before DO, 0.4mg/g CA after DO
--- ▲ --- 0.5mg/g MNT + 2mg/g RM+1mg/g SUNPHENON-OS2 before DO, 0.4mg/g CA after DO
—✕— 0.5mg/g MNTbefore bleach, 2mg/g RM+2m g/g SUNPHENON-OS2 before DO, 0.04m g/g CA after DO

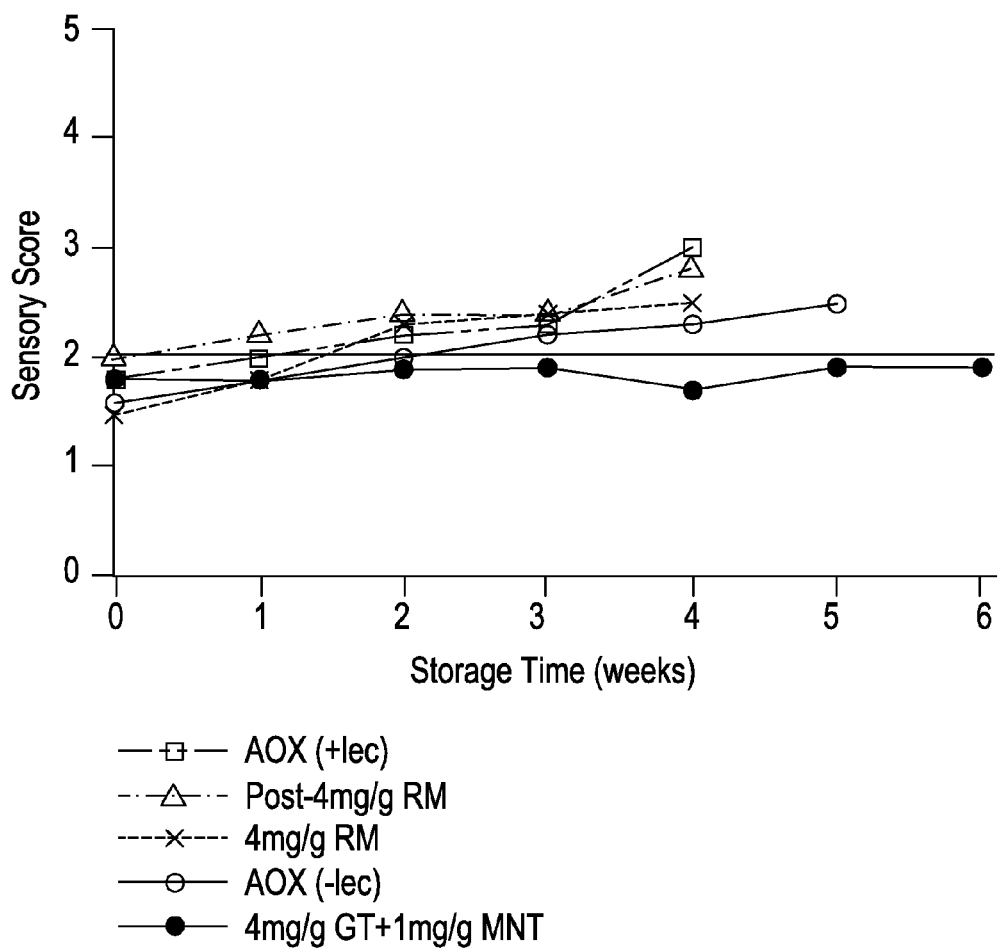

REFINEMENT OF OILS USING GREEN TEA EXTRACT ANTIOXIDANTS

FIELD

The subject matter disclosed herein generally relates to methods of improving the sensory and oxidative stability of oils (e.g., plant and animal oils). Also, the subject matter disclosed herein generally relates to methods of preparing and stabilizing oils.

BACKGROUND

Polyunsaturated fatty acids (PUFAs), including omega-3, omega-6 and omega-9 fatty acids, are vital to everyday life and function. For example, the beneficial effects of omega-3 fatty acids like all-cis-5,8,11,14,17-eicosapentaenoic acid (EPA) and all-cis-4,7,10,13,16,19-docosahexaenoic acid (DHA) on lowering serum triglycerides are well established. All-cis-9,12,15-octadecatrienoic acid (ALA) is the precursor essential fatty acid of EPA and DHA. All-cis-5,8,11,14-eicosatetraenoic acid (AA) and its precursors all-cis-6,9,12-octadecatrienoic acid (GLA) and all-cis-9,12-octadecadienoic acid (LA) have been shown to be beneficial to infants.

Several of these compounds are also known for other cardioprotective benefits such as preventing cardiac arrhythmias, stabilizing atherosclerotic plaques, reducing platelet aggregation, and reducing blood pressure. See e.g., Dyrberg et al., In: Omega-3 Fatty Acids: Prevention and Treatment of Vascular Disease. Kristensen et al., eds., Bi & Gi Publ., Verona-Springer-Verlag, London, pp. 217-26, 1995; O'Keefe and Harris, *Am J Cardiology* 2000, 85:1239-41; Radack et al., "The effects of low doses of omega-3 fatty acid supplementation on blood pressure in hypertensive subjects: a randomized controlled trial." *Arch Intern Med* 151:1173-80, 1991; Harris, "Extending the cardiovascular benefits of omega-3 fatty acids." *Curr Atheroscler Rep* 7:375-80, 2005; Holub, "Clinical nutrition: 4 omega-3 fatty acids in cardiovascular care," *CMAJ* 166(5):608-15, 2002. Indeed, the American Heart Association has also reported that omega-3 fatty acids can reduce cardiovascular and heart disease risk. Other benefits of omega-3 fatty acids are those related to the prevention and/or treatment of inflammation and neurodegenerative diseases, and to improved cognitive development. See e.g., Sugano and Michihiro, "Balanced intake of polyunsaturated fatty acids for health benefits." *J Oleo Sci* 50(5):305-11, 2001.

The fatty acids EPA and DHA can be synthesized in the human body from ALA; however, the conversion rate from this precursor molecule is limited (Muskiet et al., "Is docosahexaenoic acid (DHA) essential? Lessons from DHA status regulation, our ancient diet, epidemiology and randomized controlled trials," *J Nutr* 134(1):183-6, 2004). Accordingly, EPA and DHA in the body are primarily derived from dietary sources (e.g., traditionally oily fish and, more recently, microbial sources such as fungi and algae). Diets rich in fish oils are known to have many beneficial effects for heart disease, cancer, arthritis, allergies, and other chronic diseases. Epidemiological clinical trials have shown that increasing the dietary intake of PUFAs such as omega-3 fatty acids, in the form of fish or of fish oil supplements, may reduce various risk factors associated with cardiovascular disease. See e.g., The American Heart Association, Scientific Statement, "Fish Consumption, Fish Oil, Omega-3 Fatty Acids and Cardiovascular Disease," November 2002; Appel et al., "Does supplementation of diet with 'fish oil' reduce blood pressure? A meta-analysis of controlled clinical trials." *Arch Intern Med* 153(12):1429-1438, 1993; GISSI-Prevenzione Investigators. "Dietary supplementation with omega-3 polyunsaturated fatty acids and vitamin E after myocardial infarction: results of the GISSI-Prevenzione trial." *Lancet* 354:447-55, 1999.

In addition to fish oil sources of EPA and DHA, these PUFAs, as well as ALA, AA and GLA, can be and are derived from microbial sources including, without limitation, *Mortiarella alpina* for ARA and various species of Thraustochytrids for DHA and EPA. Plants are now being modified genetically to include genes that produce various PUFAs in further efforts to reduce costs associated with commercial production of these oils.

Despite the strong evidence for the benefit of PUFAs like EPA and DHA in prevention of cardiovascular disease, the average daily consumption of these fatty acids by North Americans is estimated to be between 0.1 to 0.2 grams, compared to a suggested daily intake of 0.65 grams to confer benefit (Webb, "Alternative sources of omega-3 fatty acids." Natural Foods Merchandiser 2005, XXVI (8):40-4). Since altering dietary patterns of populations is difficult, many people do not like to eat fish, and the notion of consuming oils derived from microbes has not achieved general acceptance, the supplementation of diets with PUFAs is an important approach to addressing this problem. Unfortunately, many PUFAs are sensitive to oxidation and can have unpleasant sensory properties.

In light of the health benefits of PUFAs such as omega-3 and omega-6 fatty acids, it is desirable to find new ways to improve their sensory and storage stabilities. The ability to improve sensory and oxidative characteristics allows PUFAs to be incorporated into a wider variety of comestible compositions, supplements, and pharmaceutical formulations. The compositions and methods disclosed herein address these and other needs.

SUMMARY

In accordance with the purposes of the disclosed materials, compounds, compositions, and methods, as embodied and broadly disclosed herein, the disclosed subject matter, in one aspect, relates to methods of improving the sensory and oxidative stability of an oil. In a further aspect, the disclosed subject matter relates to methods of preparing and stabilizing oils. Additional advantages will be set forth in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE FIGURES

The accompanying Figures, which are incorporated in and constitute a part of this specification, illustrate several aspects described below.

FIG. 3 depicts the sensory scores of FG30TG oil (18% EPA and 12% DHA or total EPA+DHA content of about 30%) containing a blend containing an enhanced rosemary extract (ERM) (8 mg/g) or an enhanced rosemary extract (ERM) (6 mg/g) and 2 mg/g green tea extract (SUNKATOL™) or 4 mg/g green tea extract (SUNKATOL™) and 0.04 mg/g citric acid (CA), deodorized using steam under pilot scale conditions, and stored at ambient temperature.

FIG. 8 depicts the sensory scores of algal oil (DHA-O) containing a blend containing 4 mg/g green tea extract and 1 mg/g mixed natural tocopherols (MNT) or 4 mg/g rosemary extract (RM) or 0.09 mg/g rosemary extract (RM), 0.34 mg/g MNT and 0.34 mg/g ascorbyl palmitate or 0.09 mg/g rosemary extract, 0.34 mg/g MNT, 0.34 mg/g ascorbyl palmitate and 2.7 mg/g lecithin. In the figure, the following abbreviations are used: GT=green tea extract (SUNPHENON-OS2™), AOX (−lec)=0.09 mg/g RM, 0.34 mg/g ascorbyl palmitate and 0.34 mg/g MNT, AOX (+lec)=0.09 mg/g RM, 0.34 mg/g ascorbyl palmitate, 0.34 mg/g MNT and 2.7 mg/g lecithin, lec=lecithin, and MNT=mixed natural tocopherols (TOCOBLEND L701P™, Vitablend).

DETAILED DESCRIPTION

Figure 1A:
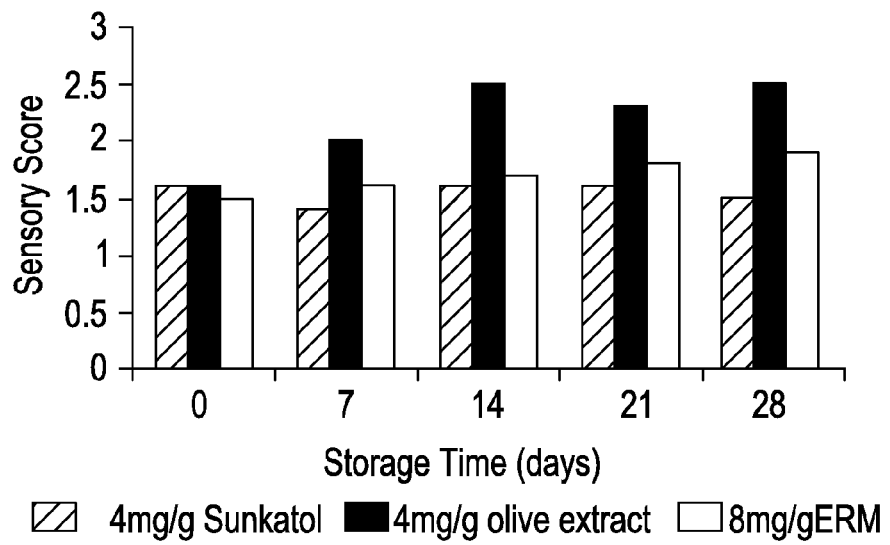
FIG. 1A depicts the sensory scores of nitrogen deodorized, food grade triacyl glycerol fish oil (FG30TG) with 18% EPA and 12% DHA or total EPA+DHA content of about 30% containing green tea extract (SUNKATOL™) (4 mg/g) or olive extract (4 mg/g) or a blend containing an enhanced rosemary extract (ERM) (8 mg/g), deodorized under nitrogen in laboratory conditions, and stored at ambient temperature. The sensory scores were based on a scale of 0 to 5, with 0 being the best and indicating no unacceptable odors or flavors, and 5 being the worst, highly unacceptable with extreme fishy flavor. A score of 2 indicated the borderline acceptance and any score greater than 2 was considered as failing.

The materials, compounds, compositions, and methods described herein may be understood more readily by reference to the following detailed description of specific aspects of the disclosed subject matter and the Examples and Figures included herein.

Before the present materials, compounds, compositions, articles, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

DEFINITIONS

In this specification and in the claims that follow, reference will be made to a number of terms, which shall be defined to have the following meanings:

Throughout the specification and claims the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an extract" includes mixtures of two or more such extracts, reference to "the antioxidant" includes mixtures of two or more such antioxidants, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. "About" can mean within 5% of the stated value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "2" is disclosed, then "about 2" is also disclosed.

References in the specification and concluding claims to parts by weight of a particular element or component in a composition denotes the weight relationship between the element or component and any other elements or components in the composition for which a part by weight is expressed. Thus, in a composition comprising 2 parts by weight of component X and 5 parts by weight component Y, X and Y are present at a weight ratio of 2:5, and are present in such ratio regardless of whether additional components are comprised in the composition.

A weight percent (wt. %) of a component, unless specifically stated to the contrary, is based on the total weight of the formulation or composition in which the component is included.

As used herein, by a "subject" is meant an individual. Thus, the "subject" can include domesticated animals (e.g., cats, dogs, etc.), livestock (e.g., cattle, horses, pigs, sheep, goats, etc.), laboratory animals (e.g., mouse, rabbit, rat, guinea pig, etc.), and birds. "Subject" can also include a mammal, such as a primate or a human.

Reference will now be made in detail to specific aspects of the disclosed materials, compounds, compositions, and methods, examples of which are illustrated in the accompanying Examples and Figures.

Methods and Materials

Disclosed herein are methods of improving the sensory and/or oxidative stability of an oil. The first step of the method involves providing a mixture comprising an oil and an antioxidant composition, which are each described below. Providing such a mixture involves the combination of the oil and the antioxidant composition. Combining these two compositions is performed before deodorization of the oil, during deodorization, or immediately after when the oil is beginning to cool from the deodorization process. Combining these two compositions can be performed by common techniques. For example, the oil can be added to a vessel containing the antioxidant compositions. Alternatively, the antioxidant composition can be added to a vessel containing the oil. In still another method, the oil and antioxidant composition are combined simultaneously into the same vessel. In most cases the antioxidant composition is combined with the oil at ambient temperatures.

Further, the antioxidant compositions disclosed herein can contain various components. Each of these can be added together or separately to the oil. Still further, the antioxidant composition can be a solid or dissolved in a suitable liquid prior to being combined with the oil.

Oils

Many oils can be used, and thus have their sensory and/or oxidative stability's improved, by the methods disclosed herein. Typically, the methods disclosed herein use oils that are susceptible to oxidation and/or poor sensory outcomes from storage and processing. For example, suitable oils for use in the disclosed methods can comprise one or more PUFAs and/or derivatives thereof. Derivatives of PUFAs can include alkyl esters (e.g., methyl or ethyl esters), glyceride esters (e.g., mono, di, and triacylglycerol), sterol esters (e.g., phytosterol esters), and salts of PUFAs (e.g., sodium, potassium, magnesium, and chromium salts). Any mixture or combinations of PUFAs and/or derivatives thereof are also suitable for use in the methods disclosed herein.

Particularly desirable PUFAs that can be used in the disclosed methods are omega-3 fatty acids. An omega-3 fatty acid is an unsaturated fatty acid that contains as its terminus $CH_3-CH_2-CH=CH-$. Generally, an omega-3 fatty acid has the following formula:

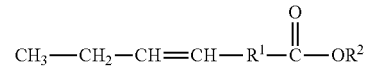

wherein $R^1$ is a $C_3$-$C_{40}$ alkyl or alkenyl group comprising at least one double bond and $R^2$ is H or alkyl group. The term "alkane" or "alkyl" as used herein is a saturated hydrocarbon group (e.g., methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like). The term "alkene" or "alkenyl" as used herein is a hydrocarbon group containing at least one carbon-carbon double bond. Asymmetric structures such as (AB)C=C(CD) are intended to include both the E and Z isomers (cis and trans). In a further example, $R^1$ can be a $C_5$-$C_{38}$, $C_6$-$C_{36}$, $C_8$-$C_{34}$, $C_{10}$-$C_{32}$, $C_{12}$-$C_{30}$, $C_{14}$-$C_{28}$, $C_{16}$-$C_{26}$, or $C_{18}$-$C_{24}$ alkenyl group. In yet another example, the alkenyl group of $R^1$ can have from 2 to 6, from 3 to 6, from 4 to 6, or from 5 to 6 double bonds. Still further, the alkenyl group of $R^1$ can have from 1, 2, 3, 4, 5, or 6 double bonds, where any of the stated values can form an upper or lower endpoint as appropriate. Specific examples of omega-3 fatty acids include, but are not limited to, natural and synthetic, α-linolenic acid (18:3ω3) (ALA), octadecatetraenoic acid (18:4ω3)(stearidonic acid), eicosapentaenoic acid (20:5ω3) (EPA), docosahexaenoic acid (22:6ω3) (DHA), docosapentaenoic acid (22:5ω3) (DPA), eicosatetraenoic acid (24:4ω3), 16:3ω3, 24:5ω3, and/or nisinic acid (24:6ω3); others are noted elsewhere herein.

These and other PUFAs, in either their free, esterified, or salt forms, can be found in and/or obtained from marine oils (e.g., fish oil, seal oil, krill oil), microbial oils (including natural as well as modified microbes whether by way of classical mutagenesis or genetic alteration) such as algae oil (e.g., microalgae oil), fungal oil, perilla oil, as well as plant oil (whether derived from naturally occurring plants or genetically modified plants), among others. Precursors of PUFAs, for example, ALA and GLA and derivatives such as polyglycolized derivatives or polyoxyethylene derivatives can also be suitable oils for use in the disclosed methods.

In a preferred aspect, the methods disclosed herein use oil that comprises DHA and/or EPA, a $C_1$-$C_6$ alkyl ester thereof, a triacylglycerol ester thereof, a phytosterol ester thereof, a salt thereof, and/or any mixture thereof. Triacylglycerol oils (referred to as TG oils) can be used. Still further, the disclosed methods can use oils comprising re-esterified triacylglycerols. In some examples, however, the oil is not a fatty acid ethyl ester.

In specific examples, the oil can comprise a microbial oil, for example, and algal oil (e.g., oil from a dinoflagellate such as *Crypthecodinium cohnii*) or fungal oil (e.g., oil from *Mortiarella Alpina, Thraustochytrium, Schizochytrium*, or a mixture thereof), and/or plant oil, including any mixture thereof.

In specific examples, the oil can comprise a marine oil, such as natural, semi-refined, refined, concentrated, light pressed, alkaline treated, heat treated, light brown, or heavy brown fish oil. Marine oils suitable for use herein include, but are not limited to, squid oil, cuttle fish oil, octopus oil, krill oil, seal oil, whale oil, and the like, including any mixture or combination thereof. The marine oil can comprise a fish oil. Examples of suitable fish oils include, but are not limited to, Atlantic fish oil, Pacific fish oil, or Mediterranean fish oil, or any mixture or combination thereof. In more specific examples, a suitable fish oil can be, but is not limited to, bonito oil, pilchard oil, tilapia oil, tuna oil, sea bass oil, halibut oil, spearfish oil, barracuda oil, cod oil, menhaden oil, sardine oil, anchovy oil, capelin oil, herring oil, mackerel oil, salmonid oil, tuna oil, and shark oil, including any mixture or combination thereof. Non-alkaline treated fish oil is also a suitable oil for use in the disclosed methods. Any PUFA oil and combination of PUFA oils can be used in the disclosed methods.

The disclosed methods can also be used with vegetable oils such as olive oil, corn oil, palm oil, sunflower oil, flaxseed, and the like.

The PUFAs usable herein can also be crude oils, semi-refined, or refined oils from any of the sources disclosed herein. In the most preferred example, the oil can be bleached and/or non-deodorized oil.

Antioxidants

The antioxidant composition used in the disclosed methods comprises one or more antioxidant components, at least one of which is a green tea extract. Though not required, one or more additional antioxidant components can also be present along with the green tea extract. In one specific example, the antioxidant composition comprises a green tea extract, rosemary extract, tocopherols, and other antioxidants.

Green Tea Extract

The antioxidant composition described herein contains a green tea extract. Green tea extracts include various components that have antioxidant activity, such as polyphenolic compounds (i.e., catechins). Examples of polyphenolic compounds that can be present in green tea extracts suitable for use herein include epigallocatechin gallate (EGCG), epigallocatechin (EGC), epicatechin gallate (ECG), epicatechin (EC), and any mixture thereof.

The green tea extracts that can be used in the methods disclosed herein have one or more polyphenolic compounds present in the extract in an amount from about 1% to about 90%, from about 5% to about 85%, from about 10% to about 80%, from about 15% to about 75%, from about 20% to about 70%, from about 25% to about 65%, from about 30% to about 60%, from about 35% to about 55%, or from about 40% to about 50% by weight of the green tea extract, exclusive of any carriers.

In a preferred aspect, the green tea extract is an oil-based extract (i.e., oil-soluble extract) rather than a water-based extract (i.e., water-soluble extract). It is also preferred that the green tea extract be substantially free (i.e., less than 1% by weight) of low molecular weight solvents. Oil-soluble green tea extracts that are substantially free (i.e., less than 1% by weight) of polyglycerol polyricinoleate carriers are also particularly preferred.

Suitable green tea extracts can also be combined with a carrier. Green tea extracts that include the carrier glyceryl caprylate (CAS: 26402-26-6) and/or decaglyceryl-10-decaoleate (CAS: 11094-60-3) can be used. Other carriers such as vegetable oils, like soy bean, palm, and olive oil, can also be used with green tea extracts. Compositions containing from about 1 to about 10% by weight of the green tea extract and from about 99 to about 90% by weight of a carrier can be used. For example, compositions containing less than about 10, 9, 8, 7, 6, 5, 4, 3, 2, or 1% by weight of the green tea extract and the balance being a carrier, or carrier with MNTs (mixed natural tocopherols), can be used. Suitable green tea extracts can also have added MNTs, though those oil soluble extracts without added MNTs are still acceptable.

A commercially available green tea extract that is suitable for use in the methods described herein is SUNKATOL™ from Taiyo Kagaku Co. (Yokkaichi, Mie, Japan). SUNKATOL™ is a mixture of green tea extract, mixed natural tocopherols in vegetable oil, and monoglycerol fatty acid esters blended in ethanol. Further examples of suitable green tea extracts include SUNPHENON 100S™, SUNPHENON DCF-1™, SUNPHENON LA-50™, SUNPHENON OS-1 AND SUNPHENON OS-2, which are all commercially available from Taiyo Kagaku Co. GUARDIAN 20M™ is another green tea extract that is commercially available from Danisco AS (Copenhagen, Denmark). GUARDIAN 20M™ is a filtered ethanol extract of green tea to which ascorbyl palmitate and partial glyceride citrate esters have been added. This green tea extract can be used, though it is less preferred.

In certain examples, green tea extracts containing ascorbyl palmitate or ascorbic acid are not preferred. Thus, green tea extracts that are substantially free (i.e., less than 1% by weight) of ascorbyl palmitate or ascorbic acid can be used. While not wishing to be bound by theory, ascorbyl palmitate or ascorbic acid becomes a strong pro-oxidant when present during deodorization and can change the color of the oil to brown when heated. Further, green tea extracts that contain maltodextrin as a carrier are not preferred. Not wishing to be bound by theory, this is because the maltodextrin can brown the oil if present during heating at deodorization temperature. Still further, it is desirable to use green tea extracts that are substantially free (i.e., less than 1% by weight) of citrem or other citrates as a carrier.

In certain specific examples, the green tea extract comprises an oil-soluble green tea extract and a carrier, wherein the carrier comprises one or more of a vegetable oil and monoglycerol fatty acid ester (e.g., glyceryl caprylate, decaglyceryl-10-decaoleate, or a mixture of the two). The green tea extract can also be substantially free of polyglycerol polyricinoleate, ascorbyl palmitate, ascorbic acid, and citrate carriers. Carriers such as soy bean oil, palm oil, or olive oil can be used.

In the disclosed methods, the green tea extract can be used in an amount of from about 0.1 to about 10 mg of extract per gram of the oil. In some examples, the green tea extract can be used in an amount of from about 0.5 to about 9, from about 1 to about 8, from about 2 to about 7, from about 3 to about 6, or from about 4 to about 5 mg of extract per gram of the oil. For example, the green tea extract can be used in an amount of about 0.1, about 0.2, about 0.3, about 0.4, about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.6, about 2.7, about 2.8, about 2.9, about 3.0, about 3.1, about 3.2, about 3.3, about 3.4, about 3.5, about 3.6, about 3.7, about 3.8, about 3.9, about 4.0, about 4.1, about 4.2, about 4.3, about 4.4, about 4.5, about 4.6, about 4.7, about 4.8, about 4.9, about 5.0, about 5.1, about 5.2, about 5.3, about 5.4, about 5.5, about 5.6, about 5.7, about 5.8, about 5.9, about 6.0, about 6.1, about 6.2, about 6.3, about 6.4, about 6.5, about 6.6, about 6.7, about 6.8, about 6.9, about 7.0, about 7.1, about 7.2, about 7.3, about 7.4, about 7.5, about 7.6, about 7.7, about 7.8, about 7.9, about 8.0, about 8.1, about 8.2, about 8.3, about 8.4, about 8.5, about 8.6, about 8.7, about 8.8, about 8.9, about 9.0, about 9.1, about 9.2, about 9.3, about 9.4, about 9.5, about 9.6, about 9.7, about 9.8, about 9.9, or about 10.0 mg extract per gram of the oil, where any of the stated values can form an upper and/or lower endpoint of a range. In some examples, the green tea extract can be used in an amount of from about 0.1 to about 10 mg of extract per gram of oil.

Rosemary Extract

The antioxidant compositions for use in the disclosed methods can further include a rosemary extract. Rosemary extracts also contain components with antioxidant activity. Examples of components having antioxidant activity that are found in rosemary extract include carnosol, carnosic acid, methoxy carnosic acid, rosmarinic acid, rosmanol, rosmaridiphenol, and any mixture thereof. One or more components having antioxidant activity can be present in the rosemary extract in an amount from about 1% to about 90%, from about 5% to about 85%, from about 10% to about 80%, from about 15% to about 75%, from about 20% to about 70%, from about 25% to about 65%, from about 30% to about 60%, from about 35% to about 55%, or from about 40% to about 50% by weight of the rosemary extract. The rosemary extract components that have antioxidant activity can be present in different proportions depending on the particular rosemary extract.

Suitable rosemary extracts are commercially available from suppliers such as Kalsec, Inc. (Kalamazoo, Mich.). DURALOX™ is an enhanced rosemary extract that is a mixture of rosemary extract, MNT, and citric acid in vegetable oil. HERBALOX™ is a rosemary extract in vegetable oil. These are suitable for use herein. Other commercially available rosemary extracts can be used as well. In the disclosed methods, the rosemary extract, either enhanced with agents like MNT or citric acid or without, can be used in an amount from about 0.1 to about 10 mg extract per gram of the oil. In some examples, the rosemary extract can be used in an amount of from about 0.5 to about 8, from about 0.1 to about 5, from about 2 to about 7, from about 3 to about 6, or from about 4 to about 5 mg extract per gram of the oil. For example, the rosemary extract can be used in an amount of about 0.1, about 0.2, about 0.3, about 0.4, about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.6, about 2.7, about 2.8, about 2.9, about 3.0, about 3.1, about 3.2, about 3.3, about 3.4, about 3.5, about 3.6, about 3.7, about 3.8, about 3.9, about 4.0, about 4.1, about 4.2, about 4.3, about 4.4, about 4.5, about 4.6, about 4.7, about 4.8, about 4.9, about 5.0, about 5.1, about 5.2, about 5.3, about 5.4, about 5.5, about 5.6, about 5.7, about 5.8, about 5.9, about 6.0, about 6.1, about 6.2, about 6.3, about 6.4, about 6.5, about 6.6, about 6.7, about 6.8, about 6.9, about 7.0, about 7.1, about 7.2, about 7.3, about 7.4, about 7.5, about 7.6, about 7.7, about 7.8, about 7.9, about 8.0, about 8.1, about 8.2, about 8.3, about 8.4, about 8.5, about 8.6, about 8.7, about 8.8, about 8.9, about 9.0, about 9.1, about 9.2, about 9.3, about 9.4, about 9.5, about 9.6, about 9.7, about 9.8, about 9.9, or about 10.0 mg extract per gram of the oil, where any of the stated values can form an upper and/or lower endpoint of a range. In some examples, the rosemary extract can be used in an amount of from about 0.5 to about 8 mg of extract per gram of oil.

Tocopherols

Still further, the antioxidant composition can include one or more tocopherols. Tocopherols include isomers and derivatives of tocopherol, including alpha-tocopherol, beta-tocopherol, delta-tocopherol, and gamma-tocopherol. In some examples, the antioxidant compositions disclosed herein can include mixed natural tocopherols (MNT). The mixed natural tocopherols can be any combination of alpha-tocopherol, beta-tocopherol, delta-tocopherol, and gamma-tocopherol from a natural source. Suitable MNTs for use in the methods described herein include TOCOBLEND L50IP™ or TOCOBLEND L70IP™ which is a mixture of MNT in vegetable oil commercially available from Vitablend Nederland B.V. (The Netherlands). In some examples, the MNT can be provided to the disclosed antioxidant compositions by virtue of them already being present as a component of a commercially available green tea extract (e.g., SUNKATOL™) or rosemary extract (e.g., an enhanced rosemary extract). Alternatively, should the green tea or rosemary extract not contain any MNT, MNT can be included as a separate component of the antioxidant composition.

In some examples, the tocopherol is used in the disclosed methods in an amount of from about 0.05 to about 10, from about 0.05 to about 5, from about 0.05 to about 1, from about 1 to about 5, from about 2 to about 8, from about 3 to about 6, or from about 4 to about 5 mg tocopherol per gram of the oil. For example, the tocopherol can be used in an amount of about 0.05, about 0.1, about 0.5, about 1.0, about 1.5, about 2.0, about 2.5, about 3.0, about 3.5, about 4.0, about 4.5, about 5.0, about 5.5, about 6.0, about 6.5, about 7.0, about 7.5, about 8.0, about 8.5, about 9.0, about 9.5, or about 10.0 mg tocopherol per gram of the oil, where any of the stated values can form an upper and/or lower endpoint of a range. In some examples, the tocopherol can be used in an amount of from about 0.05 to about 4 mg of tocopherol per gram of oil.

Additional Antioxidants

In addition to the green tea extract, and optional rosemary extract and tocopherol, the disclosed antioxidant composition can also optionally include further antioxidants such as vitamin E, $CoQ_{10}$, sage extract, oregano extract, algal extracts, resveratrol, and synthetic antioxidants (e.g., BHT, BHA, TBHA, TBHQ, ethoxyquin, alkyl gallates, and hydroquinones, tocotrienols).

Exemplary Antioxidant Compositions

The disclosed antioxidant composition contains green tea extract and can further include one or more additional antioxidant components, including rosemary extract, a tocopherol (e.g., mixed natural tocopherols), additional antioxidants or any mixture or combination thereof. The disclosed antioxidant composition can remove the odors present in the oil. Additionally, the antioxidant components of the antioxidant composition retain their antioxidant activities after the oil is deodorized. For example, the green tea extract, rosemary extract, tocopherols, and additional antioxidants added prior to, during, or just after deodorization can retard the oxidation of the PUFAs caused by the high temperatures of the deodorization process. Not to be bound by theory, it is believed that the antioxidants added at these stages of deodorization (i.e., before, during, or just after) prevent the generation of free radicals, break down and scavenge peroxy radicals, and inactivate catalytic metals through complexing or scavenging. Another advantage of adding these antioxidants at these stages of deodorization is that inherent odors and flavors of the antioxidant and their carriers can be removed during deodorization.

The components having antioxidant activity in the disclosed antioxidant compositions can act synergistically with one another to stabilize oils. The antioxidant components of green tea extract, rosemary extract, and tocopherols can act synergistically to scavenge free radicals generated during the oxidation of unsaturated fatty acids in the oils and break down peroxy radicals. As will be discussed below, ascorbyl palmitate added after deodorization when the oil is relatively cool (e.g., about 50° C. or below) can act as a peroxide scavenger and a chelating agent to further promote the synergistic activity. Further, citric acid added after deodorization when the oil is relatively cool (e.g., about 50° C. or below) can scavenge catalytic metals (e.g., Fe and Cu) in the oils to prolong the oxidative storage of the oils.

One or more of the antioxidant components can be included in the antioxidant compositions in varying amounts as described herein. In some examples, at least two antioxidant components are included in the antioxidant composition, at least one being from a green tea extract. For example, the antioxidant composition can include two or more antioxidant components, three or more antioxidant components, four or more antioxidant components, five or more antioxidant components, or six or more antioxidants. In some examples, two or more of the antioxidant components can be combined to form the antioxidant composition prior to adding the composition to the oil. In other embodiments, the antioxidant components of the disclosed antioxidant composition can each be added individually to the oil. In still other examples, some of the antioxidant components can be pre-blended and added to the oil and some of the antioxidant components can be added individually to the oil. The particular way the antioxidant components are added to the oil is not essential, as long as they are added before, during, or just after deodorization, when the oil is still hot (i.e., about 90° C. or above).

Suitable antioxidant components include the commercially available antioxidants described above, including enhanced or unenhanced rosemary extracts, green tea extract, and optionally tocopherols like MNT. In some examples, these blends can be added to the oil and further antioxidants can be added subsequently to the oil. For example, one or more of the antioxidant components can be added to the mixture at one point in the method and can be followed by citric acid, ascorbyl palmitate, or both of these after deodorization at a later stage in the method. An exemplary antioxidant composition contains 4 mg/g green tea extract. A further exemplary antioxidant blend is a mixture of 2 mg/g rosemary extract, 2 mg/g green tea extract, and 0.04 mg/g citric acid. In another example, the antioxidant composition is substantially free (i.e., less than 1 wt. %) of ascorbic acid.

Deodorization

After the oil and antioxidant composition, which again contains a green tea extract and optional other antioxidant components, are combined to form a mixture, the oil is then deodorized. An alternative method involves adding the antioxidant composition containing a green tea extract during deodorization, or just after when the temperature of the oil is beginning to cool and has a temperature of about 90° C. or above.

Steam or nitrogen deodorization are the preferred process for deodorization (see e.g., Bailey "Steam Deodorization of Edible Fats and Oils," *Ind Eng Chem* 33(3)404-408, 1941). Deodorization can also be achieved by molecular distillation, wiped film distillation, supercritical fluid extraction, or any other suitable method in the art can be used for de Deodorization reduces or removes volatile compounds from oil that may impart odors to the oil. In some examples, deodorization is used to remove free fatty acids present in the oil. Deodorization is performed at an elevated temperature. Suitable temperatures at which the deodorization can be performed include, but are not limited to, from about 120 to about 250° C., from about 130 to about 240° C., from about 140 to about 230° C., from about 150 to about 220° C., from about 160 to about 210° C., from about 170 to about 200° C., or from about 180 to about 190° C. In other examples, the mixture can be steam deodorized at about 120, about 125, about 130, about 135, about 140, about 145, about 150, about 155, about 160, about 165, about 170, about 175, about 180, about 185, about 190, about 195, about 200, about 205, about 210, about 215, about 220, about 225, about 230, about 235, about 240, about 245, or about 250° C., where any of the stated values can form an upper and/or lower endpoint of a range. In some specific examples, the mixture can be steam deodorized at above about 150° C., or more specifically, from about 175 to about 200° C. or, still more specifically, at about 190° C.

When the antioxidant composition is added during the deodorization process, it is added at the temperatures noted herein for the deodorization. Thus, the oil can be from about 120° to about 250° C., or any range therein as noted above. When the antioxidant is added just after deodorization, when the oil is cooling, it can be added when the oil is above about 90° C. As the oil cools below about 90° C., precipitation can occur. Thus, the disclosed antioxidant composition can be added the oil when it is cooling and is at a temperature of from about 90 to about 250° C., from about 90 to about 200° C., from about 90 to about 150° C., from about 90 to about 125° C., from about 100 to about 150° C., from about 125 to about 175° C. or from about 90 to about 100° C.

Steam deodorizing the mixture can take place over a period of time, for example, for at least about 10, about 20, about 30, about 40, about 50, about 60, about 70, about 80, about 90, about 100, about 110, about 120, about 130, about 140, about 150, about 160, about 170, about 180, about 190, or about 200 minutes. In some examples, the steam deodorizing step is performed for from about 100 to about 200, from about 110 to about 190, or from about 120 to about 180 minutes. In some specific examples, the steam deodorizing is performed for 120 minutes at about 190° C.

In other examples, nitrogen deodorization can be used instead of steam. The time and temperature parameters for nitrogen deodorization can be the same as those noted herein for steam deodorization.

While not wishing to be bound by theory, deodorizing in the presence of the disclosed antioxidant composition, or adding the antioxidant composition when the oil is cooling after deodorization and is still hot (i.e., above about 90° C.) can break down certain components in the antioxidant composition, resulting in actually more and/or stronger antioxidant components. For example, it is believed that polyphenolic compounds present in green tea and rosemary extracts break down during deodorization and at elevated temperatures into smaller compounds, with equal or greater antioxidant stability than the polyphenolic compounds present in the extract before deodorization or well after deodorization when the oil is relatively cool. This beneficial effect would not be seen if the green tea or rosemary extract is added after deodorization to a deodorized (or fully refined) oil. It is also possible to remove the inherent flavors and odors associated with the antioxidant composition, without also removing their antioxidant properties, by having them present during deodorization.

It is also seen that when the antioxidant composition is added before deodorization, typical carriers for the green tea extracts are not needed. Citrates are sometimes used as a carrier for green tea extract to facilitate its solubility in oil. Such carriers are not needed in the disclosed processes because the deodorization process facilitates the solubility of the green tea extract in the oil.

Post-Deodorization Antioxidant Addition

After steam deodorizing, the mixture can be allowed to cool. In some examples, the mixture can be allowed to cool to about 80 to about 120° C. During this cooling phase, but not after, one or both of citric acid and ascorbyl palmitate can be added to the deodorized oil. In some embodiments, the citric acid and/or ascorbyl palmitate is added to the deodorized oil at from about 80° C. to about 120° C., or from about 90° C. to about 100° C.

Citric Acid

Not wishing to be bound by theory, adding citric acid after deodorization promotes the synergistic effect of the pre-deodorization antioxidant composition (i.e., the green tea extract and optionally rosemary extract and tocopherols) by chelating metals such as Fe and Cu, which induce autooxidation during storage. Thus, citric acid can prolong the oxidative stability of the oils and allow the oils to be stored for long terms. On the other hand, citrate esters should be avoided because they can make the oil cloudy.

In some examples, the citric acid can be added to the deodorized oil in an amount of from about 0.001 to about 2, from about 0.005 to about 1.5, from about 0.01 to about 1, from about 0.02 to about 0.5, or from about 0.04 to about 0.1 mg citric acid per gram of the oil. For example, the citric acid can be used in an amount of about 0.001, about 0.002, about 0.003, about 0.004, about 0.005, about 0.006, about 0.007, about 0.008, about 0.009, about 0.01, about 0.015, about 0.02, about 0.025, about 0.03, about 0.035, about 0.04, about 0.045, about 0.05, about 0.055, about 0.06, about 0.065, about 0.07, about 0.075, about 0.08, about 0.085, about 0.09, about 0.095, about 0.1, about 0.2, about 0.3, about 0.4, about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, or about 2.0 mg citric acid per gram of the oil, where any of the stated values can form an upper and/or lower endpoint of a range. In some examples, the citric acid can be used in an amount of from about 0.02 to about 0.5 mg citric acid per gram of oil.

Ascorbyl Palmitate

Not wishing to be bound by theory, ascorbyl palmitate has a dual function of improving the oxidative stability during storage by acting synergistically with the pre-deodorization antioxidant blend to scavenge peroxides. Further, ascorbyl palmitate acts as a chelating agent to further impart antioxidant activity to the oil. The ascorbyl palmitate should not be added when the oil is about 60° C. or below. Preferably it is added when the temperature of the oil is held at about 100° C. for 20-30 minutes.

A commercially available ascorbyl palmitate suitable for use in the methods described herein includes GRINDOX™ ascorbyl palmitate (Danisco; Copenhagen, Denmark). In some examples, an alternative ascorbic acid derivative can be used in place of or in addition to ascorbyl palmitate. An example of a suitable alternative ascorbic acid derivative includes ascorbyl stearate. Thus, ascorbyl stearate is contemplated herein as an alternative everywhere ascorbyl palmitate is disclosed.

In some examples, the ascorbyl palmitate can be added to the deodorized oil in an amount of from about 0.001 to about 2, from about 0.005 to about 1.5, from about 0.01 to about 1, from about 0.02 to about 0.5, or from about 0.04 to about 0.1 mg ascorbyl palmitate per gram of the total composition. For example, the ascorbyl palmitate can be used in an amount of about 0.001, about 0.002, about 0.003, about 0.004, about 0.005, about 0.006, about 0.007, about 0.008, about 0.009, about 0.01, about 0.015, about 0.02, about 0.025, about 0.03, about 0.035, about 0.04, about 0.045, about 0.05, about 0.055, about 0.06, about 0.065, about 0.07, about 0.075, about 0.08, about 0.085, about 0.09, about 0.095, about 0.1, about 0.2, about 0.3, about 0.4, about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, or about 2.0 mg ascorbyl palmitate per gram of the oil, where any of the stated values can form an upper and/or lower endpoint of a range. In some examples, the ascorbyl palmitate can be used in an amount of from about 0.05 mg/g to about 0.5 mg ascorbyl palmitate per gram of oil.

Products

The oils obtained by the disclosed methods have enhanced sensory and oxidative stabilities. The stability of these product compositions can be determined by measuring, for example, the peroxide value of the compositions. Peroxide value (PV) refers to the concentration of peroxide compounds in the oil measured in meq/kg. Peroxide compounds are produced during oxidation of the oil; thus, an increased peroxide value after a period of time, as compared to initial peroxide values at the initial time, indicates that oxidation has occurred. The peroxide value of the product oils can be minimized by reducing the formation of peroxides or by removing/decomposing the peroxides present in the oil. Thus, the oils prepared according to the methods described herein have minimized peroxide values due to the use of the antioxidants as described herein. Any method for measuring the peroxide values of an oil as known in the art can be used in the methods described herein, such as, for example, AOCS Cd 8-53, which is incorporated by reference herein in its entirety.

Another method for determining the oxidative stability of the compositions produced according to the methods described herein is to utilize a standardized sensory panel. The standardized sensory panel assesses the smell, taste, tactile attributes, and flavor of the oil and also, the characteristics of a food product containing the oil. The panelists included in these evaluations can select from numeric scales and assign a sensory score to rate the acceptability of the oils tested. Specific odor and taste indicators associated with oils include anise, bacony, beany, bitter, bland, boiled potatoes, burnt, buttery, cardboardy, corny, creamy, cucumber, deep fried, earthy, fishy, fruity, geranium, grassy, green, hay, heated oil, herby, hully, hydrogenated oil, lard, light struck oil, melon, metallic, mushroom, musty, nutty, overheated oil, oxidized, painty, paraffin oil, peanut oil, pecan oil, petroleum, phenolic, pine oil, plastic, pointy, pondy, pumpkin, rancid, raw, reverted oil, rubbery, soapy, sour, sulfur, sunflower seed shell, watermelon, waxy, weedy and woody.

The compositions produced according to the methods described herein can be stored for a prolonged period of time. For example, the sensory characteristics for fish oil deodorized according to the disclosed methods using SUNKATOL™ was acceptable for minimum of 3 months during the storage at ambient temperature (20-25° C.). The sensory characteristics of the oil was monitored by 5-10 trained panelists and reported as Sensory Panel (Oil) Reported Evaluations (SPORE). The values of SPORE ranges from 0 to 5 and 0 is highly acceptable (no taste, no smell) whereas 5.0 is extremely fishy and not acceptable. The marginal acceptance of SPORE is 2.0 and above 2.0 is considered failing.

The disclosed products can also contain low levels of oxidized fatty acids and/or aldehydes. For example, many oils containing unsaturated fatty acids can oxidize and break down, resulting in the production of volatile aldehydes like hexanal and a non-volatile portion of the oxidized fatty acid, which remains part of the composition. The products disclosed herein can have reduced levels of such oxidized fatty acids and/or aldehydes, as compared to other marine oils.

The amount of the aldehydes and oxidized fatty acids in oil can be measured by reacting the oil with p-Anisidine and determining the p-Anisidine value. The p-Anisidine value is defined as 100 times the absorbance (at 350 nm) of a solution resulting from reaction of 1 gram of oil in 100 mL of solvent. p-Anisidine values can be determined by well-known methods such as the method described in ISO method number 6885:1998, which is available from the International Organization for Standardization; this method is incorporated by reference herein in its entirety.

Typical p-Anisidine values for crude marine oil can be about 20. The products disclosed herein, however, can have p-Anisidine values of less than or equal to about 10. In other examples, the disclosed compositions can have p-Anisidine values of less than or equal to about 9, 8, 7, 6, 5, 4, 3, 2, or 1 as determined by ISO 6885:1998, where any of the stated values can form an upper and/or lower endpoint of a range. Preferably, the disclosed product compositions can have a p-Anisidine value of less than 3.

It is also noted that the oils that can be used in the disclosed methods, namely those that can be combined with the antioxidant composition and then deodorized can have p-Anisidine values of greater than about 10, for example about 11, 12, 13, 14, 15, 16, 17, 18, 19, or 20, as determined by ISO 6885:1998, where any of the stated values can form an upper and/or lower endpoint of a range. In this way one can readily distinguish oils before performing the disclosed methods and those after the disclosed methods have been performed.

Peroxide value (PV) is another parameter indicative of oil stability. PV is reflective of the primary oxidation of unsaturated fatty acids in fish oil, whereas p-anisidine value is reflective of the secondary oxidation. PV is measured by volumetric titrations according to a modified AOCS method. Preferred PV values for oils disclosed herein are less than about 50 meq/kg. In most cases the PV values will be less than about 10, 8, 6, 4, 2 or about 0 meq/kg. Conjugated dienes can also be used to measure the polymers produced by prolonged oxidation. Conjugated dienes are measured spectrophotometrically and typical results are about 0. Thiobarbituric acid method, carotene bleaching method as well as flavor volatiles also can be used to measure the levels of oxidation and stability of oil.

The compositions prepared according to the methods described herein have a wide variety of uses. For example, the product compositions can be incorporated into nutritional supplements, pharmaceutical formulations, delivery devices, and foodstuffs. In some embodiments, the compositions can be used as a source of a PUFA, like omega-3 fatty acids, to lower triglycerides and influencing diabetes related biochemistry. The compositions prepared according to the methods are desirable because of the stability of the oils and the sensory aspects of the oils.

Alternative Methods

In one aspect, the disclosed methods can also involve a bleaching step. The bleaching step can occur before the oil is combined with the antioxidant composition or after the oil and antioxidant composition are combined, yet before deodorization. Thus, in one embodiment, the disclose method comprises the step of combining a bleached oil and antioxidant composition as disclosed herein before deodorization. In an alternative embodiment, the disclosed method comprises the step of combining an oil and antioxidant composition as disclosed herein, bleaching the oil, and then deodorization.

In still a further embodiment, the oil can be contacted with a tocopherol, bleached, combined with the antioxidant composition comprising a green tea extract, and deodorized.

Bleaching oil can be performed by contacting the oil with an adsorbent to provide a mixture, heating the mixture to from about 100 to about 210° C., and removing the adsorbent from the mixture, to provide the bleached oil. Suitable adsorbent can be silica, clay, carbon, or a mixture thereof. Suitable examples of silica can be TRYSIL™, which is available from Grace Davison (Columbia, Md.). Suitable examples of clay can be Grade F-160 activated clay, which is available from manufactured by Englehardt Corporation (Jackson, Miss.). In some examples, the adsorbent can be a combination of silica and clay. Suitable combinations can comprise silica and clay in a weight ratio of from about 10:1 to about 1:10, more typically about 1:1.

The amount of adsorbent used can be from less than or equal to about 20% by weight of the oil. For example, the adsorbent can be used in an amount of about 20, 15, 10, 5, or 1 wt. %, based on the weight of the oil, where any of the stated values can form an upper and/or lower endpoint of a range. For example, about 5 to about 7 wt. % clay can be used.

Heating the mixture of adsorbent and oil can be performed at various temperatures, but, typically, the method can take place at an elevated temperature. The precise elevated temperature can depend on the particular oil and amount thereof being used, the particular adsorbent and the amount thereof being used, the ratio of oil to the adsorbent, the particular pressure, preference, and the like. Suitable temperatures at which the disclosed methods can be performed include, but are not limited to, from about 100 to about 210° C., from about 110 to about 200° C., from about 120 to about 190° C., from about 130 to about 180° C., from about 140 to about 170° C., or from about 150 to about 160° C. It is also contemplated that the oil is heated prior to contacting with the adsorbent. Such a pre-heating step can be performed at any of temperatures and temperature ranges described herein.

Bleaching can be conducted under reduced pressure. A suitable pressure is less than or equal to about 1 Torr or less than or equal to about 0.1 Torr.

Bleaching can take place over a period of at least 1, 10, 20, 30, 40, 50, or 60 minutes. In some examples, heating in the presence of the adsorbent can be performed for from about 10 to about 20, from about 20 to about 30, from about 10 to about 30, or from about 30 to about 60 minutes. Further, after heating, the mixture can be allowed to cool from about 30 to about 60 minutes.

After bleaching, the adsorbent can be removed from the mixture. Removing the adsorbent can be performed by any methods known in the art. For example, the adsorbent can be removed by filtration, centrifugation, or other like methods. In some embodiments, the bleached oil can undergo a second bleaching step.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

Certain materials, compounds, compositions, and components disclosed herein can be obtained commercially or readily synthesized using techniques generally known to those of skill in the art. For example, the starting materials and reagents used in preparing the disclosed compositions are either available from commercial suppliers such as Ocean Nutrition Canada Limited (Dartmouth, Canada), Acros Organics (Morris Plains, N.J.), Fisher Scientific (Pittsburgh, Pa.), or Sigma-Aldrich (St. Louis, Mo.) or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989).

Example 1

Antioxidant Blends

The following types of antioxidants were used to prepare antioxidant blends: SUNKATOL™, SUNPHENON OS-1™, SUNPHENON OS-2™, TOCOBLEND L50IP™, TOCOBLEND L70IP™, citric acid, and GRINDOX™ ascorbyl palmitate. Rosemary extract and an enhanced rosemary extract that contained mixed natural tocopherols and citric acid in vegetable oil were purchased from Kalsec, Inc. (Kalamazoo, Mich.). SUNKATOL™ is a mixture of green tea extract, mixed natural tocopherols in vegetable oil, and glycerol mono fatty acid esters blended in ethanol and is commercially available from Taiyo Kagaku Co. (Yokkaichi, Mie, Japan). TOCOBLEND L50IP™ and TOCOBLEND L70IP™ are mixtures of mixed natural tocopherols in vegetable oil and are commercially available from Vitablend Nederland B.V. (The Netherlands). Food grade citric acid can be obtained from known commercial suppliers as discussed above. GRINDOX™ ascorbyl palmitate is commercially available from Danisco (Copenhagen, Denmark).

Example 2

Deodorization of Oils

FG30TG fish oil, DHA fish oil and algal oil were deodorized with antioxidant blends including an enhanced rosemary extract, mixed natural tocopherols (MNT), and green tea extracts. Deodorization can be achieved by steam distillation, molecular distillation, wiped film distillation, supercritical fluid extraction, or any suitable method known in the art. Ascorbyl palmitate and citric acid were added to some mixtures after deodorization. Antioxidant blends were prepared and added in different proportions to FG30TG oil, DHA oil and algal oil. The FG30TG oil, DHA oil and algal oil used in the Examples were triacylglycerol oils. Mixtures of antioxidant blends and oil were thoroughly mixed prior to deodorization. Exemplary antioxidant blends include 4 or 6 mg/g green tea extract (SUNKATOL™); 4 mg/g olive extract; 8 mg/g enhanced rosemary extract; 4 mg/g rosemary extract; a mixture of 6 mg/g enhanced rosemary extract and 2 mg/g green tea extract (SUNKATOL™); a mixture of 4 mg/g green tea extract (SUNKATOL™) and 0.04 mg/g citric acid; a mixture of 2-4 mg/g rosemary extract+1-2 mg/g MNT; 4-6 mg/g green tea extract (SUNKATOL™); a mixture of 2 mg/g green tea extract (SUNKATOL™)+2 mg/g rosemary extract; a mixture of 2 mg/g enhanced rosemary extract+6 mg/g green tea extract (SUNKATOL™); a mixture of 2 mg/g rosemary extract, 1.5 mg/g MNT, and 0.04 mg/g citric acid; a mixture of 4 mg/g rosemary extract, 1.5 mg/g MNT, and 0.04 mg/g citric acid; a mixture of 2 mg/g rosemary extract, 2 mg/g green tea extract (SUNKATOL™), and 0.04 mg/g citric acid; a mixture of 2 mg/g rosemary extract, 2 mg/g green tea extract (SUNKATOL™), and 0.5 mg/g ascorbyl palmitate; a mixture of 2 mg/g rosemary extract, 2 mg/g green tea extract (SUNPHENON-OS1™), and 0.04 mg/g citric acid; a mixture of 2 mg/g rosemary extract, 2 mg/g (SUNKATOL™), and 0.04 mg/g citric acid; a mixture of 0.5 mg/g MNT, 2 mg/g rosemary extract, 1 mg/g (SUNPHENON-OS2™) and 0.04 mg/g citric acid; a mixture of 0.5 mg/g MNT, 2 mg/g rosemary extract, 2 mg/g green tea extract (SUNPHENON-OS2™) and 0.04 mg/g citric acid; a mixture of 0.09 mg/g rosemary extract, 0.34 mg/g MNT, and 0.34 mg/g ascorbyl palmitate; a mixture of 0.09 mg/g rosemary extract, 0.34 mg/g MNT, 0.34 mg/g ascorbyl palmitate and 2.7 mg/g lecithin; and a mixture of 4 mg/g green tea extract (SUNPHENON OS-2™) and 1 mg/g MNT.

In each example except for the samples described in FIG. 8, the mixture of oil with an antioxidant or an antioxidant blend was heated to 60° C. under nitrogen and then under steam at 190° C. for 2 hours followed by the cooling to 125° C. using glycol. After holding for about 15 minutes at 125° C., the oil was cooled to 100° C. In examples where the antioxidant or antioxidant blend did not contain an enhanced rosemary extract, 0.04 mg/g citric acid was added and held under steam at 100° C. for about 25 minutes and then under nitrogen for 5 minutes. Then the oil was cooled to about 38° C. under nitrogen. In examples where the antioxidant was an enhanced rosemary extract or where the antioxidant blend contained an enhanced rosemary extract, citric acid was not added to oil. In these examples, the deodorized oil was cooled to 150 C, held for 30 minutes, and cooled rapidly to 80° C. After 12 minutes under steam and 3 minutes under nitrogen, the oil was cooled to about 38° C.

For the samples labeled AOX (−lec), AOX (+lec), 4 mg/g RM and 4 mg/g GT+1 mg/g MNT in FIG. 8, the mixture of oil with an antioxidant or antioxidant blend was cooled to 60° C. under nitrogen after deodorization. For the sample labeled "Post 4 mg/g RM" in FIG. 8, the oil was cooled to 60° C. under nitrogen after deodorization and the rosemary extract was added to the oil after the cooling step.

The sensory and peroxide values of the deodorized oils were determined Oils deodorized with olive extract were tested for comparative purposes. The sensory data was obtained using a sensory panel. The sensory of the oil deodorized with antioxidants in the lab was primarily evaluated by 1-2 trained panelists and reported as sensory score whereas all samples produced on the pilot scale level were evaluated by 5-10 trained panelists. The sensory score of the broad panel was reported as Sensory Panel (Oil) Reported Evaluations (SPORE). The values of SPORE ranges from 0 to 5 and 0 is highly acceptable (no taste, no smell) whereas 5.0 is extremely fishy and not acceptable. The marginal acceptance of SPORE is 2.0 and above 2.0 is considered failing.

Figure 1B:
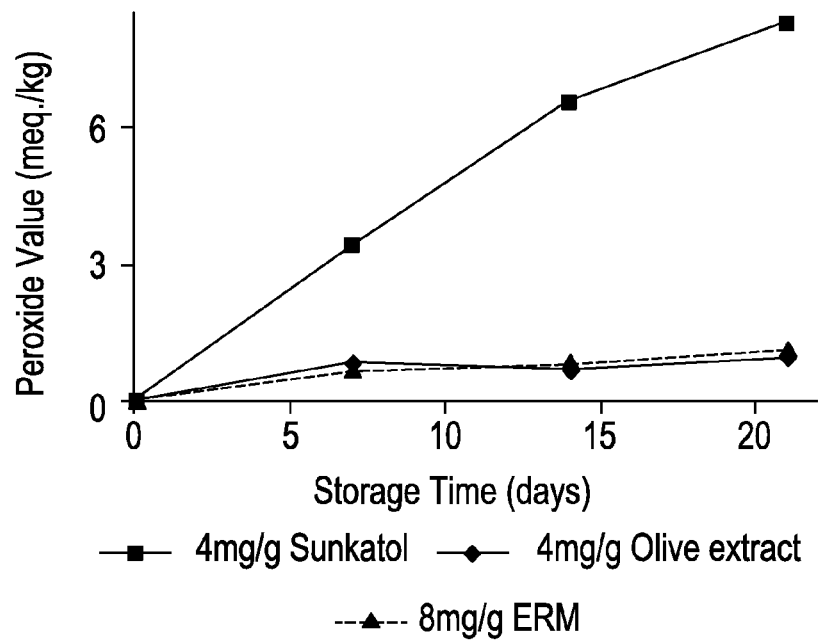
FIG. 1B depicts the peroxide values of FG30TG (18% EPA and 12% DHA or total EPA+DHA content of about 30%) fish oil containing green tea extract (SUNKATOL™) (4 mg/g) or olive extract (4 mg/g) or a blend containing an enhanced rosemary extract (ERM) (8 mg/g), deodorized under nitrogen in laboratory conditions, and stored exposed to air at ambient temperature.
Figure 2A:
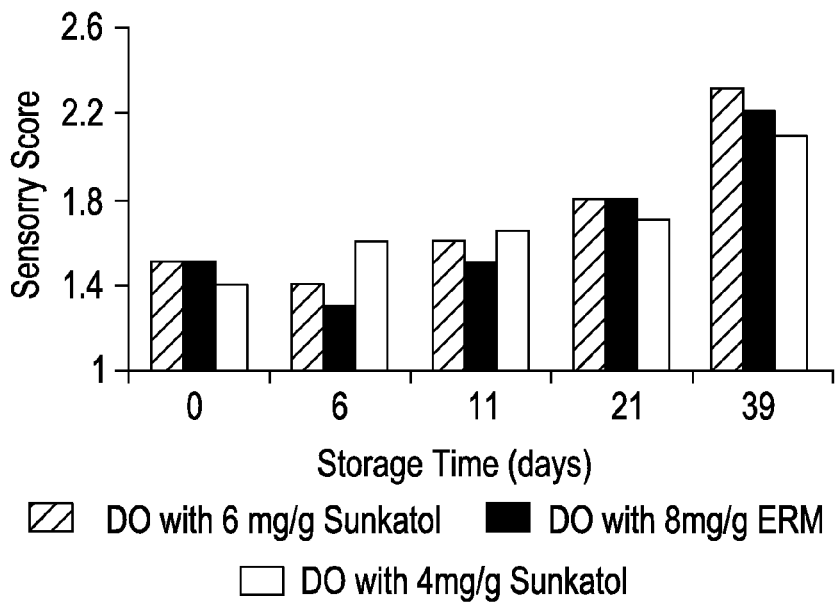
FIG. 2A depicts the sensory scores of DHA oil (tuna triacyl glycerol fish oil with about 5% EPA and 25% DHA) containing green tea extract (SUNKATOL™) (4 mg/g or 6 mg/g) or a blend containing an enhanced rosemary extract (ERM) (8 mg/g), deodorized under nitrogen in laboratory conditions, and stored at ambient temperature.
Figure 2B:
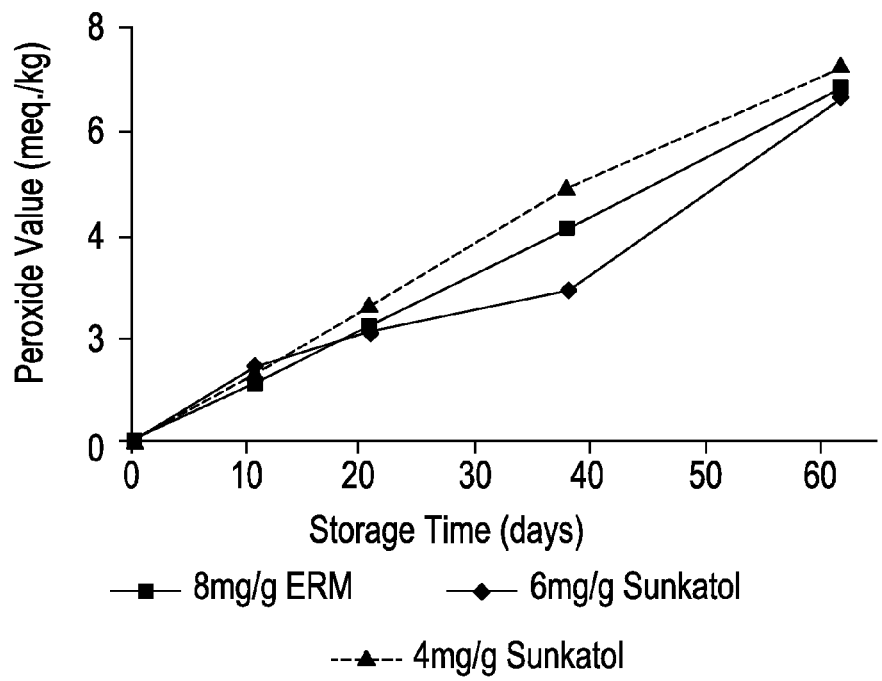
FIG. 2B depicts the peroxide values of DHA oil (tuna triacyl glycerol fish oil with about 5% EPA and 25% DHA) containing green tea extract (SUNKATOL™) (4 mg/g or 6 mg/g) or a blend containing an enhanced rosemary extract (ERM) (8 mg/g), deodorized under nitrogen in laboratory conditions, and stored exposed to air at ambient temperature.
Figure 4A:
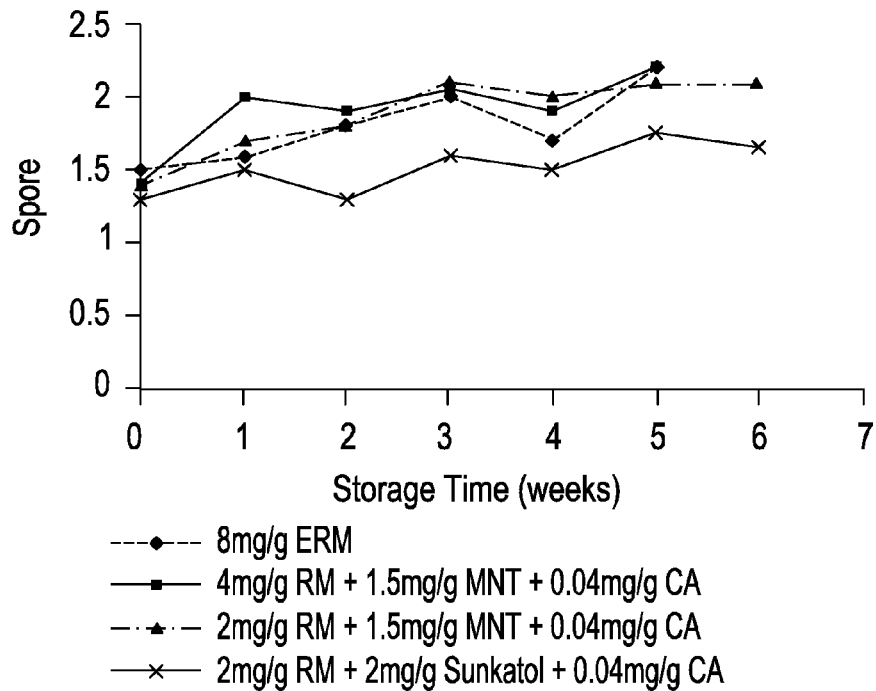
FIG. 4A depicts the sensory scores of FG30TG oil (18% EPA and 12% DHA or total EPA+DHA content of about 30%) containing a blend containing an enhanced rosemary extract (ERM) (8 mg/g) or 2 mg/g rosemary extract (RM), 1.5 mg/g mixed natural tocopherols (MNT) and 0.04 mg/g citric acid or 4 mg/g rosemary extract (RM), 1.5 mg/g MNT and 0.04 mg/g citric acid (CA) or 2 mg/g rosemary extract (RM), 2 mg/g green tea extract (SUNKATOL™) and 0.04 mg/g citric acid, deodorized using steam under pilot scale conditions, and stored at ambient temperature.
Figure 4B:
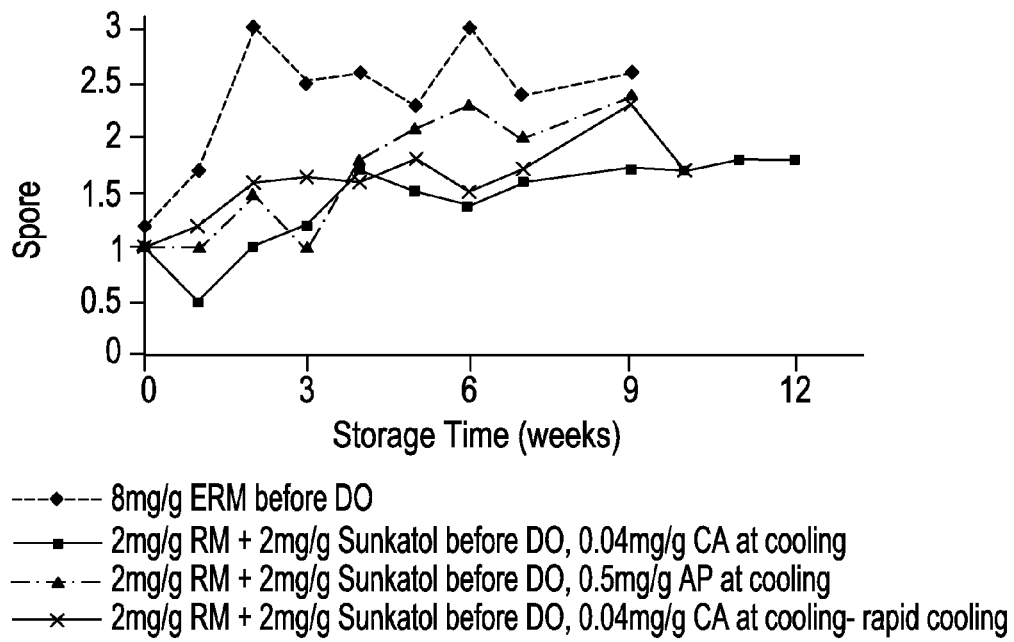
FIG. 4B depicts the sensory scores of FG30TG oil (18% EPA and 12% DHA or total EPA+DHA content of about 30%) containing a blend containing an enhanced rosemary extract (ERM) (8 mg/g) or 2 mg/g rosemary extract (RM), 2 mg/g green tea extract (SUNKATOL™) and 0.04 mg/g citric acid (CA) or 2 mg/g rosemary extract (RM), 2 mg/g green tea extract (SUNKATOL™) and 0.5 mg/g ascorbyl palmitate (AP) deodorized using steam under pilot scale conditions, and stored at ambient temperature.
Figure 7:
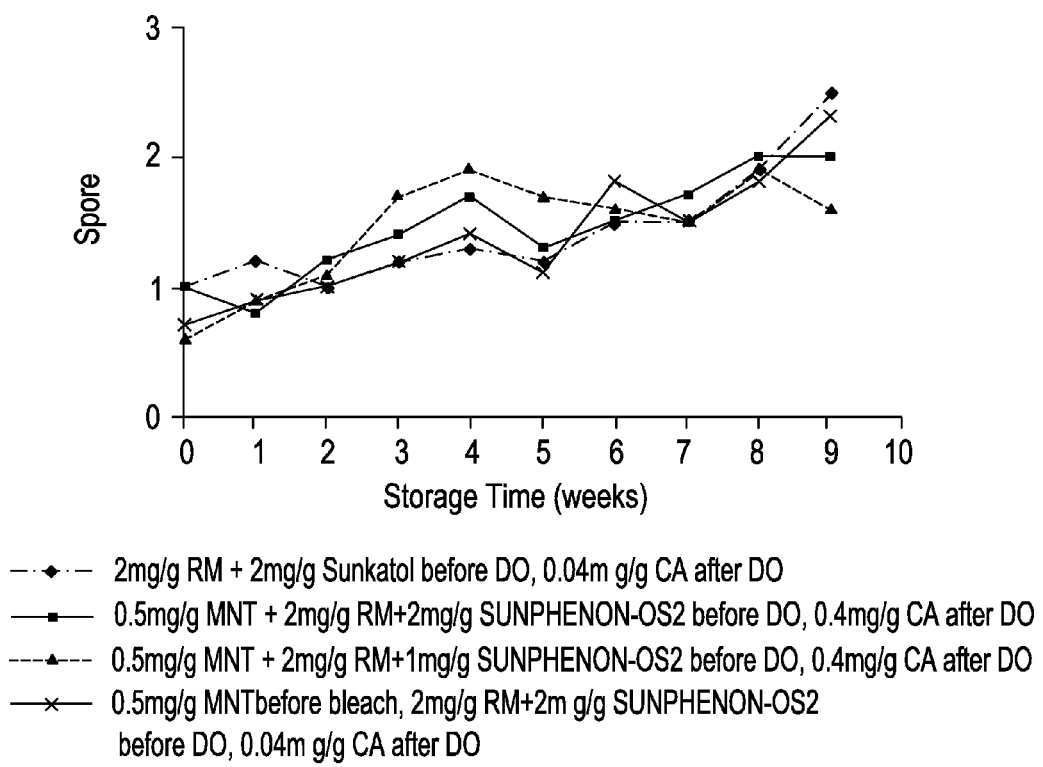
FIG. 7 depicts the sensory scores of FG30TG oil (18% EPA and 12% DHA or total EPA+DHA content of about 30%) containing a blend containing 2 mg/g rosemary extract (RM), 2 mg/g green tea extract (SUNKATOL™) and 0.4 mg/g CA (citric acid) or 0.5 mg/g mixed natural tocopherols (MNT), 2 mg/g rosemary extract (RM), 2 mg/g green tea extract (SUNPHENON-OS2™) and 0.04 mg/g CA or 0.5 mg/g mixed natural tocopherols (MNT), 2 mg/g rosemary extract (RM), 1 mg/g green tea extract (SUNPHENON-OS2™) (SPOS-2) and 0.04 mg/g CA or 0.5 mg/g MNT (added before bleaching), 2 mg/g rosemary extract (RM), 2 mg/g (SUNPHENON-OS2™) and 0.04 mg/g citric acid deodorized using steam under pilot scale conditions, and stored at ambient temperature.

FIGS. 1A and 2A show the sensory of oil deodorized in the lab under nitrogen with green tea blend in comparison with the enhanced rosemary extract. FIGS. 1B and 2B show the peroxide values of corresponding samples. It is noted that FIGS. 1B and 2B are from an accelerated study (open to air) to compare the efficiency of the antioxidant blend, not to maintain the lowest possible PV values. In other experiments the PV of the deodorized oils is zero, as well as during storage in sealed bottle, not left open to air. FIGS. 3, 4, and 7 show the sensory stability (determined by the sensory panel) of FG30TG oil deodorized with steam under pilot scale clearly indicating the improvement in the sensory stability. The sensory stability of the oils deodorized with the SUNKATOL™ green tea blend was comparable to the oil deodorized with the enhanced rosemary extract. The sensory stability was improved when a mixture of green tea, rosemary extract, and citric acid was used. FIG. 8 shows the sensory stability (determined by the sensory panel) of algal oil deodorized with steam. The sensory stability of the oil deodorized with the green tea extract (SUNPHENON-OS2™) and mixed natural tocopherols was improved as compared to the mixtures without green tea extract.

Example 3

Comparison of SUNKATOL™ and SUNPHENON™

Figure 5:
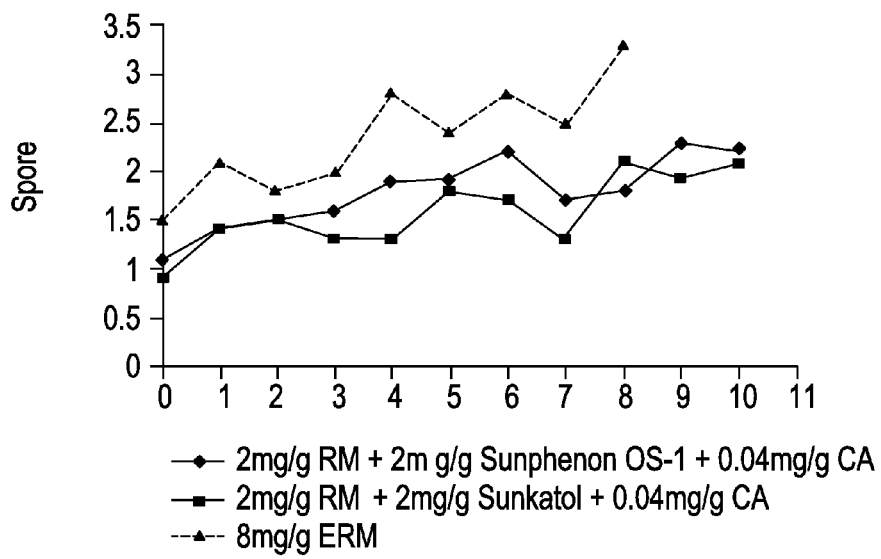
FIG. 5 depicts the sensory scores of FG30TG oil (18% EPA and 12% DHA or total EPA+DHA content of about 30%) containing a blend containing an enhanced rosemary extract (ERM) (8 mg/g) or 2 mg/g rosemary extract (RM), 2 mg/g green tea extract (SUNKATOL™) and 0.04 mg/g citric acid (CA) or 2 mg/g rosemary extract (RM), 2 mg/g green tea extract (SUNPHENON-OS1™) and 0.04 mg/g citric acid deodorized using steam under pilot scale conditions, and stored at ambient temperature.

Green tea extract SUNPHENON OS-1™ and SUNPHENON OS-2™, which are soluble in oil, were compared with SUNKATOL™. The process outlined in Example 2 was followed except that 2 mg/g of SUNPHENON-OS1™ and 1-2 mg/g SUNPHENON OS-2™ were used. The sensory stability of FG30TG oil with each green tea extract was compared and is shown in FIG. 5. It was found that there was no considerable difference between the green tea extracts as far as sensory stability was concerned.

Example 4

OSI Study

Figure 6:
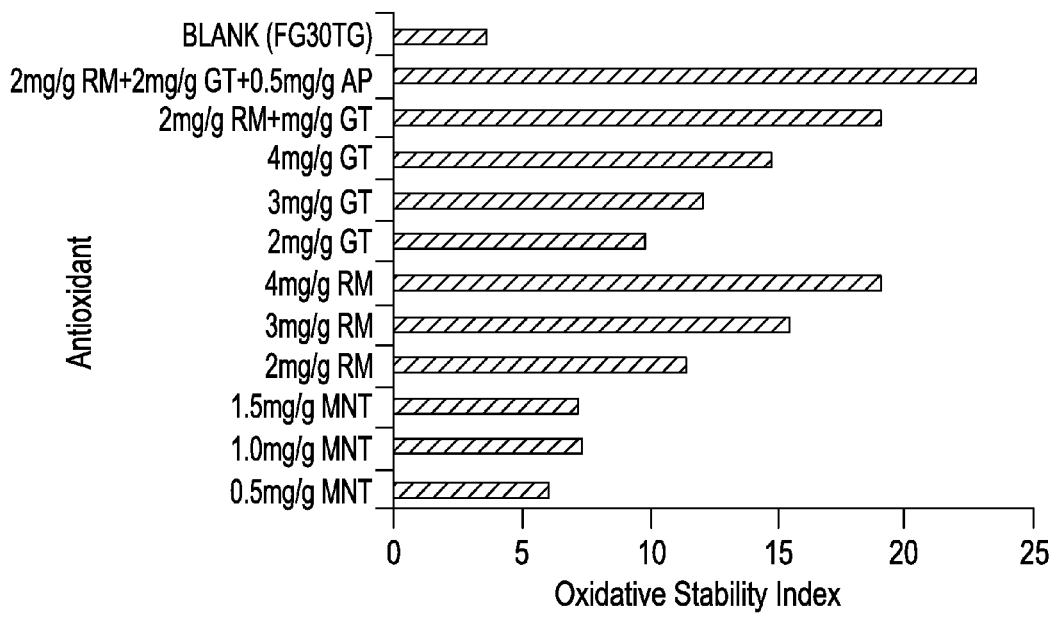
FIG. 6 depicts the induction times (Oxidative stability index or OSI) of FG30TG oil (18% EPA and 12% DHA or total EPA+DHA content of about 30%) containing green tea extract and other synergistic antioxidants. In the figure, the following abbreviations are used: RM=rosemary extract, GT=green tea extract (SUNPHENON-OS1™ or SUNPHENON-OS2™), and MNT=mixed natural tocopherols (TOCOBLEND L50IP™, Vitablend).

Induction times of different antioxidant blends containing 0.5-1.5 mg/g tocopherols, 2-4 mg/g rosemary extract, 2-4 mg/g green tea (SUNPHENON-OS1™) and a mixture of all these antioxidants containing 0.5 mg/g ascorbyl palmitate were obtained using Oxidative Stability Instrument (Omnion, ADM) and reported as Oxidative Stability Index in hours. The oil containing these antioxidants were heated at 90° C. while bubbling air through the oil and the conductivity of the volatiles of the oxidized oil dissolved in de-ionized water was measured. The point of inflection of the conductivity curve (conductivity vs. time) was recorded as the Oxidative Stability Index (FIG. 6). Induction time of the oil containing green tea can be improved by adding synergistic antioxidants such as rosemary extract as disclosed herein. Thus, the blend containing green tea, rosemary extract, mixed natural tocopherols and ascorbyl palmitate showed the highest induction time.

The compositions and methods of the appended claims are not limited in scope by the specific compositions and methods described herein, which are intended as illustrations of a few aspects of the claims and any compositions and methods that are functionally equivalent are within the scope of this disclosure. Various modifications of the compositions and methods in addition to those shown and described herein are intended to fall within the scope of the appended claims. Further, while only certain representative compositions, methods, and aspects of these compositions and methods are specifically described, other compositions and methods and combinations of various features of the compositions and methods are intended to fall within the scope of the appended claims, even if not specifically recited. Thus a combination of steps, elements, components, or constituents can be explicitly mentioned herein; however, all other combinations of steps, elements, components, and constituents are included, even though not explicitly stated.

What is claimed is:

1. A method of improving the sensory and oxidative stability of an oil, comprising:
    a) combining an oil and an antioxidant composition comprising a green tea extract to form a mixture, wherein the green tea extract comprises an oil-soluble green tea extract and a carrier, wherein the carrier comprises one or more of a vegetable oil and monoglycerol fatty acid ester;
    b) deodorizing the mixture to form a deodorized oil; and
    c) adding citric acid, and optionally, ascorbyl palmitate, to the deodorized oil,
    wherein the oil comprises at least one polyunsaturated fatty acid (PUFA).

2. The method of claim 1, wherein the deodorizing step is by steam deodorization or nitrogen deodorization.

3. The method of claim 1, wherein steps a and b are performed sequentially.

4. The method of claim 1, wherein steps a and b are performed concurrently.

5. The method of any of claims 1-4, wherein the oil comprises marine oil.

6. The method of claim 5, wherein the marine oil comprises squid oil, octopus oil, krill oil, cuttle fish oil, seal oil, whale oil, or any mixture or combination thereof.

7. The method of claim 5, wherein the marine oil comprises fish oil.

8. The method of claim 7, wherein the fish oil comprises Atlantic fish oil, Pacific fish oil, Mediterranean fish oil, or any mixture or combination thereof.

9. The method of claim 7 or claim 8, wherein the fish oil comprises tuna oil, bonito oil, sea bass oil, halibut oil, spearfish oil, barracuda oil, cod oil, menhaden oil, sardine oil, pilchard oil, anchovy oil, capelin oil, herring oil, mackerel oil, salmonid oil, or any mixture or combination thereof.

10. The method of claim 1, wherein the oil comprises a plant oil, algal oil, or fungal oil.

11. The method of claim 1 wherein the oil comprises DHA and/or EPA, a $C_1$-$C_6$ alkyl ester thereof, a triacylglycerol ester thereof, a phytosterol ester thereof, a salt thereof, or any mixture or combination thereof.

12. The method of claim 1, wherein the carrier comprises soy bean oil or olive oil.

13. The method claim 1, wherein the monoglycerol fatty acid ester is glyceryl caprylate, decaglyceryl-10-decaoleate, or a mixture of the two.

14. The method of claim 1, wherein the antioxidant composition is substantially free of polyglycerol polyricinoleate, ascorbyl palmitate, ascorbic acid, and citrate carriers.

15. The method of claim 1, wherein the antioxidant composition further comprises rosemary extract, tocopherol, or a combination thereof.

16. The method of claim 1, wherein the green tea extract is used in an amount of from 0.1 mg/g to 10 mg/g based on the weight of the oil.

17. The method of claim 15, wherein the rosemary extract is used in an amount of from 0.5 mg/g to 8 mg/g based on the weight of the oil.

18. The method of claim 15, wherein the tocopherol is used in an amount of from 0.05 mg/g to 4 mg/g based on the weight of the oil.

19. The method of claim 15, wherein the tocopherol is provided as part of a mixed natural tocopherol composition.

20. The method of claim 1, wherein deodorizing is by steam deodorization performed above about 150° C.

21. The method of claim 1, wherein deodorizing is by steam deodorization performed at about 175° C. to about 200° C.

22. The method of claim 1, wherein deodorizing is by steam deodorization performed at about 190° C.

23. The method of claim 1, wherein the steam deodorizing is performed for at least 60 minutes.

24. The method of claim 1, wherein the steam deodorizing is performed for from 100 minutes to 200 minutes.

25. The method of claim 1, wherein the steam deodorizing is performed for 120 minutes.

26. The method of claim 1, wherein the citric acid is present in an amount of from 0.02 to 0.5 mg/g based on the weight of the oil.

27. The method of claim 1, wherein the ascorbyl palmitate is present in an amount of from 0.05 mg/g to 0.5 mg/g based on the weight of the oil.

28. The method of claim 1, further comprising cooling the deodorized oil to about 80° C. to about 100° C. prior to adding citric acid, ascorbyl palmitate, or a combination thereof.

29. The method of claim 1, further comprising bleaching the oil prior to step a.

30. The method of claim 1, further comprising bleaching the oil after step a and before step b.

31. A method of improving the sensory and oxidative stability of an oil, comprising:
a) deodorizing an oil;
b) cooling the deodorized oil;
c) adding to the cooling, deodorized oil when the oil is at least about 90° C., an antioxidant composition comprising a green tea extract, wherein the green tea extract comprises an oil-soluble green tea extract and a carrier, wherein the carrier comprises one or more of a vegetable oil and monoglycerol fatty acid ester; and then
d) adding citric acid, and optionally, ascorbyl palmitate, to the oil,
wherein the oil comprises at least one polyunsaturated fatty acid (PUFA).

32. A method of preparing an oil, comprising:
a) providing an oil, wherein the oil comprises a crude oil, a semi-refined oil, or a re-esterified oil;
b) optionally treating the oil with a tocopherol;
c) bleaching the oil;
d) adding an antioxidant composition comprising a green tea extract to the bleached oil, wherein the green tea extract comprises an oil-soluble green tea extract and a carrier, wherein the carrier comprises one or more of a vegetable oil and monoglycerol fatty acid ester;
e) deodorizing the bleached oil; and
f) adding citric acid, and optionally, ascorbyl palmitate, to the deodorized oil,
wherein the oil comprises at least one polyunsaturated fatty acid (PUFA).

33. The method of claim 32, wherein the deodorizing step is by steam deodorization or nitrogen deodorization.

34. The method of claim 32, further comprising treating the oil with a tocopherol prior to bleaching the oil.

35. The method of claim 32, wherein the antioxidant composition further comprises rosemary extract.

36. The method of claim 34, wherein the antioxidant composition further comprises rosemary extract.

* * * * *